(12) United States Patent
Perdue

(10) Patent No.: US 11,769,477 B2
(45) Date of Patent: Sep. 26, 2023

(54) BASALT FIBER ACOUSTIC PANEL

(71) Applicant: JayVic LLC, Amarillo, TX (US)

(72) Inventor: Joab Jay Perdue, Amarillo, TX (US)

( * ) Notice: Subject to any disclaimer, the term of this patent is extended or adjusted under 35 U.S.C. 154(b) by 0 days.

(21) Appl. No.: 18/054,006

(22) Filed: Nov. 9, 2022

(65) Prior Publication Data
US 2023/0119745 A1   Apr. 20, 2023

Related U.S. Application Data

(63) Continuation-in-part of application No. 17/929,952, filed on Sep. 6, 2022, now abandoned, which is a continuation of application No. 17/224,106, filed on Apr. 6, 2021, now Pat. No. 11,468,872, which is a continuation-in-part of application No. 17/163,727, filed on Feb. 1, 2021, now abandoned, and a continuation of application No. 16/794,157, filed on Feb. 18, 2020, now abandoned, said application No. 17/224,106 is a continuation-in-part of application No. 15/655,850, filed on Jul. 20, 2017, now abandoned.

(60) Provisional application No. 62/806,034, filed on Feb. 15, 2019, provisional application No. 62/413,715, filed on Oct. 27, 2016, provisional application No. 62/364,315, filed on Jul. 20, 2016.

(51) Int. Cl.
*G10K 11/162* (2006.01)
*E04B 1/86* (2006.01)

(52) U.S. Cl.
CPC .............. *G10K 11/162* (2013.01); *E04B 1/86* (2013.01)

(58) Field of Classification Search
CPC ............ G10K 11/162; E04B 1/86; E04B 1/84
See application file for complete search history.

(56) References Cited

U.S. PATENT DOCUMENTS

| | | | | |
|---|---|---|---|---|
| 4,784,902 | A * | 11/1988 | Crompton | E04B 1/942 428/920 |
| 5,644,872 | A * | 7/1997 | Perdue | E04B 1/86 181/291 |
| 6,158,176 | A * | 12/2000 | Perdue | E04B 1/86 181/291 |
| 6,443,257 | B1 * | 9/2002 | Wiker | B32B 7/12 181/290 |
| 7,383,918 | B1 * | 6/2008 | Sitko | F02K 1/827 181/210 |
| 11,001,043 | B2 * | 5/2021 | Ihsan | B32B 5/26 |
| 11,468,872 | B2 * | 10/2022 | Perdue | E04B 1/86 |
| 2009/0311932 | A1 * | 12/2009 | Hughes | B32B 1/00 264/261 |
| 2011/0136401 | A1 * | 6/2011 | Hanusa | B32B 19/045 428/221 |
| 2013/0045352 | A1 * | 2/2013 | Kern | D04H 5/12 156/324 |

(Continued)

OTHER PUBLICATIONS

Https://mbiproducts.com/products/lapendary/.

*Primary Examiner* — Andrew J Triggs
(74) *Attorney, Agent, or Firm* — Shannon Warren

(57) ABSTRACT

A sound absorbing panel assembly comprising the woven basalt material. The sound absorbing panel assembly comprises a height, a width, a length, a cover and an absorbent panel. The cover comprises a woven basalt material. The absorbent panel comprises a sound absorbent acoustic panel. The absorbent panel is covered by the cover.

4 Claims, 3 Drawing Sheets

(56) References Cited

U.S. PATENT DOCUMENTS

2018/0038097 A1\* 2/2018 Perdue ................ E04B 1/86
2020/0265820 A1\* 8/2020 Perdue ............. G10K 11/162

\* cited by examiner

PRIOR ART

300

| Property | Value |
|---|---|
| Tensile strength | 2.8–3.1 GPa |
| Elastic modulus | 85–87 GPa |
| Elongation at break | 0.0315 |
| Density | 2.67 g/cm$^3$ |

| Material | Density (g/cm$^3$) | Tensile stre (GPa) | Specific strength | Elastic mod (GPa) | Specific modulus |
|---|---|---|---|---|---|
| Steel re-bar | 7.85 | 0.5 | 0.0667 | 210 | 26.7 |
| C-glass (fiberglass) | 2.46 | 2.5 | 1.35 | 69 | 28 |
| Basalt fiber | 2.65 | 2.9–3.1 | 1.57–1.81 | 85–87 | 32–33 |

BASALT FIBER ACOUSTIC PANEL

CROSS-REFERENCE TO RELATED APPLICATIONS

This application claims benefit to U.S. patent application Ser. No. 16/794,157 filed on 2022 Feb. 18 (pending) claiming benefit to 62/806,034 filed on 2019 Feb. 15, Ser. No. 17/929,952 filed on 2022 Sep. 6 claiming benefit to U.S. Pat. No. 17,224,106 filed 2021 Apr. 6 (issued on 2022 Oct. 11 as Ser. No. 11/468,872), Ser. No. 17/163,727 filed 2021 Feb. 1 (abandoned), Ser. No. 15/655,850 filed 2017 Jul. 20 (abandoned), 62/413,715 filed 2016 Oct. 27, and 62/364,315 filed 2016 Jul. 20 wherein, '106 claims benefit to each of the subsequently listed patent applications.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art is known to the Applicant.

BRIEF SUMMARY OF THE INVENTION

A sound absorbing panel assembly comprising a woven basalt material. Said sound absorbing panel assembly comprises a height, a width, a length, a cover and an absorbent panel. Said cover comprises said woven basalt material. Said absorbent panel comprises a sound absorbent acoustic panel. Said absorbent panel is covered by said cover.

Said sound absorbing panel assembly comprising said woven basalt material. Said sound absorbing panel assembly comprises said height, said width, said length, said cover and said absorbent panel. Said cover comprises said woven basalt material. Said absorbent panel comprises a sound absorbent acoustic panel. Said absorbent panel is covered by said cover. Said woven basalt material comprises basalt fibers woven into a cloth. Said woven basalt material wraps around and adheres to said absorbent panel. Said woven basalt material provides a structural support to said sound absorbing panel assembly thereby eliminating the need for a structural mats. Said absorbent panel comprises Rockwool and resin. A rockwool mat comprising materials characterized by a core density and a core binder percentage. said core density is between 2½-4½ pounds/cubic-foot. said core binder percentage is between 1¾-2¾ percent. Said rockwool mat weighs between ¼-½ oz. Said rockwool mat comprises a thickness between 35-45 mm.

BRIEF DESCRIPTION OF THE SEVERAL VIEWS OF THE DRAWING

FIGS. 3A and 3B illustrate a basalt properties table 300 and a basalt comparison table 302, respectively.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
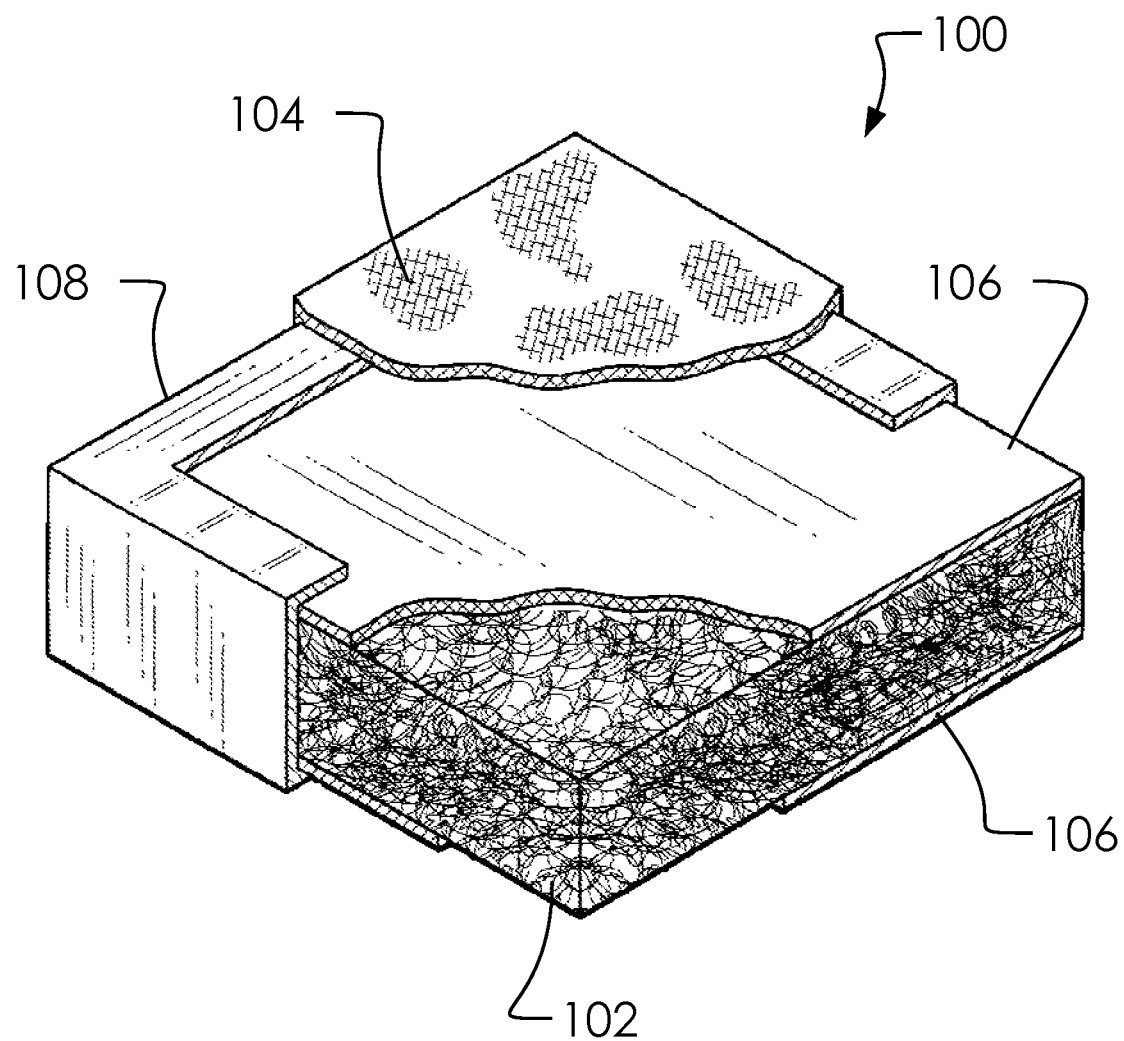
FIG. 1 illustrates a perspective overview of a prior art panel 100.

FIG. 1 illustrates a perspective overview of a prior art panel 100.

This disclosure sets out to establish that the new system comprises (1) an improvement in durability, (2) keeps a firm edge, (3) has an improved sag resistance characteristics, (4) that it does not need a frame, (5) does not need a fiberglass mat and (6) has improved fire retardance. It also has proven, better sound absorption, better fire protection qualities, and can be used in a wide range of products regardless of shape or dimension.

For contrast with the current design, said prior art panel 100 can comprise an original core design for the Applicant and was a "framed" core. A that time, the Applicant had not yet perfected our product to the point of being able to create an absorber panel that was solid enough, had little enough sag, had great enough impact resistance and edge detail to do an unframed absorber as we now do.

As is known in the art, said prior art panel 100 can comprise a mineral wool mat 102 for sound absorption, a cloth facing 104 for containment of said mineral wool mat 102, a structural mats 106 on one or more faces of said mineral wool mat 102, a frame 108 for provision of stiffness and mounting of said prior art panel 100. Said prior art panel 100 is well-known but does have shortcomings. First, said mineral wool mat 102 can have a flat front and rear surfaces and four substantially straight perimeter edges. As discussed below, said mineral wool mat 102 can comprise a density between 5 and 9 pounds per cubic foot and a thickness between 0.75 and 2.0 inches. The Applicant has advanced the art of mat composition and filed alternative applications on those advancements, such as US patent application numbers 15796569 and 15655850.

In one embodiment, 102/can comprise Rockwool®.

It was further disclosed that for said mineral wool mat 102, although said mineral wool mat 102 may be directly adhered to wall or ceiling surfaces for sound attenuation purposes, the cores are preferably converted into panels by way of the addition of said frame 108, said structural mats 106, and said structural mats 106 (a decorative fabric cover). Wherein, said frame 108 could be disposed about said mineral wool mat 102. Said frame 108 may be made of metal or plastic and said structural mats 106 may be attached to said mineral wool mat 102 with adhesive.

For said prior art panel 100, said structural mats 106 can comprise planar fiberglass boards on one or more sides of said mineral wool mat 102. In one embodiment, fiberglass can comprise a dangerous material to work with in the manufacturing plant due to flammability and harm to workers inhaling dust during manufacture. Accordingly, a safer material for fire retardance, structural support and manufacturing safety would be advantageous.

Figure 2:
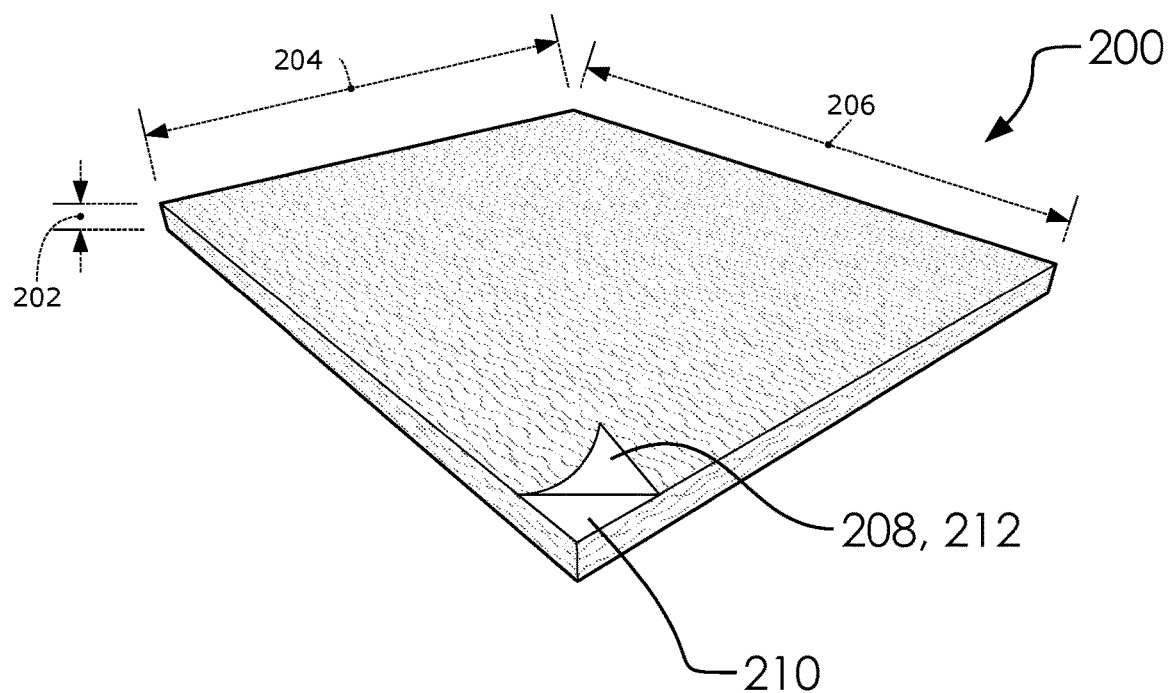
FIG. 2 illustrates a perspective overview of a sound absorbing panel assembly 200.

FIG. 2 illustrates a perspective overview of a sound absorbing panel assembly 200.

In one embodiment, said sound absorbing panel assembly 200 can comprise a height 202, a width 204, a length 206, a cover 208 and an absorbent panel 210.

As shown in FIG. 2 said cover 208 is peeled back for illustrative purposes. In production and use, said cover 208 can be adhered down and not loose.

In one embodiment, said cover 208 can comprise a woven basalt material 212. Said woven basalt material 212 can comprise a material made from fine fibers of basalt. In one embodiment, basalt can comprise minerals plagioclase, pyroxene, and olivine. Although it can be like fiberglass, said woven basalt material 212 can comprise better physical-mechanical properties than fiberglass. Another advantage of said woven basalt material 212 can comprise a lower price as it can be significantly cheaper than carbon fiber. Said woven basalt material 212 is used as a fireproof textile in the aerospace and automotive industries and can also be used as a composite to produce products such as camera tripods.

One advantage of said woven basalt material 212 can comprise fire retardancy. In said prior art panel 100, commonly fiberglass can be used with said woven basalt material 212. However, the manufacture of said prior art panel 100 can be dangerous as fiberglass can be inhaled and cause respiratory harm if not properly handled.

By eliminating said structural mats 106 entirely, said sound absorbing panel assembly 200 (1) simplifies manufacture of said sound absorbing panel assembly 200 over said prior art panel 100 by eliminating a component, (2) removes a sometimes dangerous manufacturing material of fiberglass, (3) reduces fire retardancy substantially.

As discussed above, said absorbent panel 210 can comprise Rockwool, or similar, as discussed in the applications incorporated by reference.

In one embodiment, said cover 208 and said absorbent panel 210 can be adhered together with an adhesive.

Materials such as fiberglass used in said structural mats 106 of said prior art panel 100 can bring the fire rating of said prior art panel 100 to a 10/95 for fire rating/smoke rating. However, when using said woven basalt material 212 instead of fiberglass, said sound absorbing panel assembly 200 can have a 0/0 rating for fire/smoke. Such an improvement while reducing manufacturing complexity, and improving manufacturing safety represent a substantial and patent eligible improvement within the art.

FIGS. 3A and 3B illustrate a basalt properties table 300 and a basalt comparison table 302, respectively.

As shown in said basalt properties table 300, can comprise very high tensile strength. For further analysis, said basalt comparison table 302 shows a comparison between said woven basalt material 212 verses a fiberglass component 304. Wherein, it is shown that said fiberglass component 304 is a lesser material.

Paired with the fact that said fiberglass component 304 can be harmful to workers during manufacturing, said absorbent panel 210 is a clear advancement over said prior art panel 100.

In one embodiment, 100/can be attached to a ceiling of a room, space or building for acoustic treatment of a room. Acoustic ceiling tiles and ceiling treatments are known in the art. One such system, which in part inspired this disclosure, are Lapendary® panels by a manufacturer known as MBI. An example of the Lapendary panel is included as a non-patent literature disclosure along with this application. These panels comprise at least fiberglass covered in a plastic. Although some measure of acoustic improvement can be made to a room or stadium, these panels comprise a risk to persons in the room. Namely, plastics will intime melt and warp to fail, and the fiberglass has a lower fire rating as discussed herein. By covering a ceiling in Lapendary panels, the venue owners and managers subject its guests to unnecessary risks. Contrarywise, the current system is safer for public and private spaces due to the resilience and fire-retardant characteristics.

In one embodiment, said woven basalt material 212 can comprise fibers woven of a basalt filament 306 (not illustrated) have a diameter of between 10 and 20 μm; wherein, said diameter of said basalt filament 306 is far enough above the respiratory limit of 5 μm to make basalt fiber safer for human handling and far superior to asbestos.

The following sentences are included with reference to the claims and may be interpreted as one or more preferred embodiments:

said sound absorbing panel assembly 200 comprising said woven basalt material 212. Said sound absorbing panel assembly 200 comprises said height 202, said width 204, said length 206, said cover 208 and said absorbent panel 210. Said cover 208 comprises said woven basalt material 212. Said absorbent panel 210 comprises a sound absorbent acoustic panel. Said absorbent panel 210 can be covered by said cover 208.

Said woven basalt material 212 can comprise basalt fibers woven into a cloth. Said woven basalt material 212 wraps around and adheres to said absorbent panel 210. Said woven basalt material 212 provides a structural support to said sound absorbing panel assembly 200 thereby eliminating the need for said structural mats 106.

Said absorbent panel 210 comprises Rockwool and resin.

Said mineral wool mat 102 comprising materials characterized by a core density and a core binder percentage. said core density can be between 2½-4½ pounds/cubic-foot. said core binder percentage can be between 1¾-2¾ percent. Said mineral wool mat 102 weighs between ¼-½ oz. Said mineral wool mat 102 comprises a thickness between 35-45 mm.

Said sound absorbing panel assembly 200 comprising said woven basalt material 212. Said sound absorbing panel assembly 200 comprises said height 202, said width 204, said length 206, said cover 208 and said absorbent panel 210. Said cover 208 comprises said woven basalt material 212. Said absorbent panel 210 comprises a sound absorbent acoustic panel. Said absorbent panel 210 can be covered by said cover 208. Said woven basalt material 212 comprises basalt fibers woven into a cloth. Said woven basalt material 212 wraps around and adheres to said absorbent panel 210. Said woven basalt material 212 provides a structural support to said sound absorbing panel assembly 200 thereby eliminating the need for said structural mats 106. Said absorbent panel 210 comprises Rockwool and resin. Said mineral wool mat 102 comprising materials characterized by a core density and a core binder percentage. said core density can be between 2.5-4½ pounds/cubic-foot. said core binder percentage can be between 1¾-2¾ percent. Said mineral wool mat 102 weighs between ¼-½ oz. Said mineral wool mat 102 comprises a thickness between 35-45 mm.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

These parts are introduced in this specification:
said prior art panel 100,
Said mineral wool mat 102,
Said cloth facing 104,
Said structural mats 106,
Said frame 108,
Said sound absorbing panel assembly 200,
Said height 202,
Said width 204,
Said length 206,
Said cover 208,
Said absorbent panel 210,
Said woven basalt material 212,
Said basalt properties table 300,
Said basalt comparison table 302, and
said fiberglass component 304.
Preferred embodiment follows.

Said sound absorbing panel assembly 200 comprising said woven basalt material 212.

Said sound absorbing panel assembly 200 comprises said height 202, said width 204, said length 206, said cover 208 and said absorbent panel 210. Said cover 208 comprises said woven basalt material 212. Said absorbent panel 210 comprises a sound absorbent acoustic panel. Said absorbent panel 210 can be covered by said cover 208.

Said sound absorbing panel assembly 200 comprising said woven basalt material 212. Said sound absorbing panel assembly 200 comprises said height 202, said width 204, said length 206, said cover 208 and said absorbent panel 210. Said cover 208 comprises said woven basalt material 212. Said absorbent panel 210 comprises a sound absorbent acoustic panel. Said absorbent panel 210 can be covered by said cover 208.

One or more of said sound absorbing panel assembly 200 can be attached to a ceiling of a room to control acoustic conditions.

Said woven basalt material 212 comprises fibers woven of said basalt filament 306. Wherein a diameter of said basalt filament 306 can be far enough above a respiratory limit of 5 μm to make basalt fiber safer for human handling.

Said basalt filament 306 have said diameter of between 10 and 20 μm.

Said woven basalt material 212 comprises basalt fibers woven into a cloth. Said woven basalt material 212 wraps around and adheres to said absorbent panel 210. Said woven basalt material 212 provides a structural support to said sound absorbing panel assembly 200.

Said absorbent panel 210 comprises a mineral wool material and resin.

Said mineral wool mat 102 comprising materials characterized by a core density and a core binder percentage. Said core density can be between 2½-4½ pounds/cubic-foot. Said core binder percentage can be between 1¾-2¾ percent. Said mineral wool mat 102 weighs between ¼-½ oz. Said mineral wool mat 102 comprises a thickness between 35-45 mm.

Said sound absorbing panel assembly 200 comprising said woven basalt material 212.

Said sound absorbing panel assembly 200 comprises said height 202, said width 204, said length 206, said cover 208 and said absorbent panel 210. Said cover 208 comprises said woven basalt material 212. Said absorbent panel 210 comprises a sound absorbent acoustic panel. Said absorbent panel 210 can be covered by said cover 208. Said woven basalt material 212 comprises basalt fibers woven into a cloth. Said woven basalt material 212 wraps around and adheres to said absorbent panel 210. Said woven basalt material 212 provides a structural support to said sound absorbing panel assembly 200. Said absorbent panel 210 comprises a mineral wool material and resin. Said mineral wool mat 102 comprising materials characterized by a core density and a core binder percentage. Said core density can be between 2½-4½ pounds/cubic-foot. Said core binder percentage can be between 1¾-2¾ percent. Said mineral wool mat 102 weighs between ¼-½ oz. Said mineral wool mat 102 comprises a thickness between 35-45 mm.

Said basalt filament 306 have a diameter of between 10 and 20 μm.

One or more of said sound absorbing panel assembly 200 can be attached to a ceiling of a room to control acoustic conditions.

The invention claimed is:

1. A sound absorbing panel assembly comprising a woven basalt material, wherein:
    said sound absorbing panel assembly comprises a height, a width, a length, a cover and an absorbent panel;
    said cover comprises said woven basalt material;
    said absorbent panel comprises a sound absorbent acoustic panel;
    said absorbent panel is covered by said cover;
    said woven basalt material comprises basalt fibers woven into a cloth;
    said woven basalt material wraps around and adheres to said absorbent panel;
    said woven basalt material provides a structural support to said sound absorbing panel assembly;
    said absorbent panel comprises a mineral wool material and resin;
    said mineral wool material comprising materials characterized by a core density and a core binder percentage;
    said core density is between 2½-4½ pounds/cubic-foot;
    said core binder percentage is between 1¾-2¾ percent;
    said mineral wool material weighs between ¼-½ oz; and
    said mineral wool material comprises a thickness between 35-45 mm.

2. The sound absorbing panel assembly of claim 1, wherein:
    a basalt filament have a diameter of between 10 and 20 μm.

3. The sound absorbing panel assembly of claim 2, wherein:

one or more of said sound absorbing panel assembly are attached to a ceiling of a room to control acoustic conditions.

4. A sound absorbing panel assembly for use on a ceiling of a room comprising a woven basalt material, wherein:
said sound absorbing panel assembly comprises a height, a width, a length, a cover and an absorbent panel;
said cover comprises said woven basalt material;
said absorbent panel comprises a sound absorbent acoustic panel;
said absorbent panel is covered by said cover;
said woven basalt material comprises basalt fibers woven into a cloth;
said woven basalt material wraps around and adheres to said absorbent panel;
said woven basalt material provides a structural support to said sound absorbing panel assembly;
said absorbent panel comprises a mineral wool material and resin;
said mineral wool material comprising materials characterized by a core density and a core binder percentage;
said core density is between 2½-4½ pounds/cubic-foot;
said core binder percentage is between 1¾-2¾ percent;
said mineral wool material weighs between ¼-½ oz;
said mineral wool material comprises a thickness between 35-45 mm; and
one or more of said sound absorbing panel assembly are attached to said ceiling of said room to control acoustic conditions.

\* \* \* \* \*